No. 783,720. PATENTED FEB. 28, 1905.
F. E. CASE.
PNEUMATIC TIRE.
APPLICATION FILED SEPT. 29, 1904.

WITNESSES
Jos. J. Hosler.
Minnie L. Anthony.

INVENTOR
Frank E. Case
BY
Harry Frease.
ATTORNEY

No. 783,720.  
Patented February 28, 1905.

UNITED STATES PATENT OFFICE.

FRANK E. CASE, OF CANTON, OHIO.

PNEUMATIC TIRE.

SPECIFICATION forming part of Letters Patent No. 783,720, dated February 28, 1905.

Application filed September 29, 1904. Serial No. 226,471.

*To all whom it may concern:*

Be it known that I, FRANK E. CASE, a citizen of the United States, residing at Canton, in the county of Stark and State of Ohio, have invented a new and useful Improvement in Pneumatic Tires, of which the following is a specification.

The invention relates to pneumatic tires for use on the wheels of bicycles, automobiles, and other vehicles; and the object of the invention is to provide a cushion for supporting the outer tube or case when the inner tube is deflated. This object is obtained by the construction and arrangement illustrated in the accompanying drawings, in which—

Figure 1:
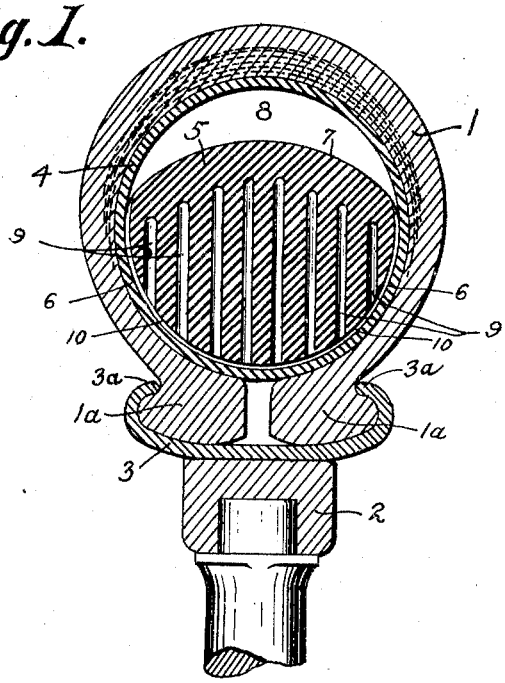
Figure 2:
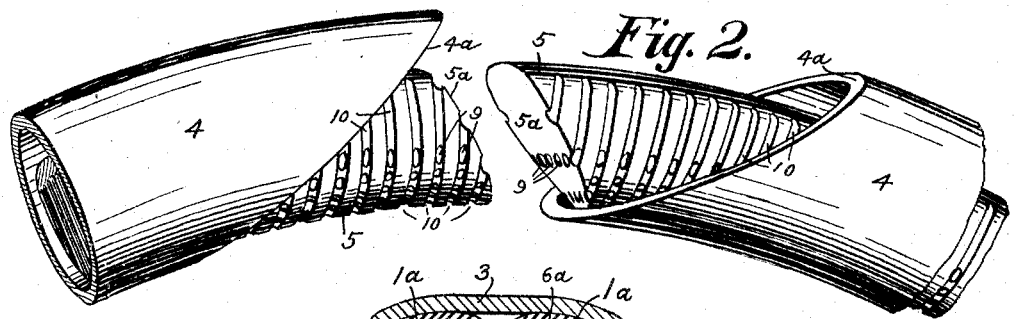

Figure 1 is a cross-section of the tire, showing the cushion-ring therein; Fig. 2, a fragmentary perspective view showing a convenient manner of assembling the cushion-ring and inner tube; and Fig. 3, a cross-section of the tire, showing the relation of the parts when the tube is deflated.

Similar numerals refer to similar parts throughout the drawings.

Figure 3:
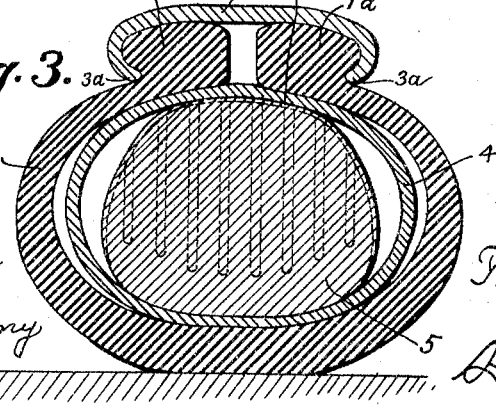

In the ordinary construction of wheels for automobiles and other similar vehicles a pneumatic tire is composed of the outer tube or case 1, which is detachably mounted on the periphery of the rim 2 of the wheel, usually on a suitable metallic rim, as 3. Within the case is inserted the inner tube 4, which is adapted to be inflated by air, and thereby to distend the case, as shown in Fig. 1. This relation of the parts is maintained, unless by reason of puncture or other accident there is a leakage of air from the inner tube, whereupon by the deflation of the inner tube the case is permitted to collapse. Although the case is made of very tough rubber, usually with strengthening-fibers, when it collapses the weight of the vehicle is carried directly on the metallic rim of the wheel, with the collapsed walls of the case and inner tube intervening between the narrow edges $3^a$ of the metallic rim and the road-bed, and the common consequence is that these walls are bruised and cut. Another objection, and a very dangerous result of such a collapse, is that by reason of the lessened diameter of the wheel suddenly occurring a rapidly-moving automobile is deflected from its course so quickly that it is beyond the power of the chauffeur to control its movements. Furthermore, when touring the facilities for mending a puncture are not always available, nor is it generally desirable to incur a delay, and if the journey is continued to a convenient repair-station, in addition to the damage to the tire and the interference in guiding the vehicle, it rides very roughly for want of a sufficient cushion for the periphery of the wheel. Such damage, danger, and discomfort are obviated by inserting the cushion-ring 5 within the inner tube, which ring is composed of tough rubber or other resilient material and has its inner face 6 laterally curved to be adjoining or adjacent to the wall of the tube, while its outer face 7 is flattened to be at a considerable interval therefrom, thus leaving the crescent-shaped air-space 8 between the outer side of the ring and the outer wall of the tube. To provide a substantial cushion and at the same time to increase the volume of air within the inner tube, I make the outer part of the cushion-ring solid and the inner part somewhat porous, as by means of the radial holes 9 and the annular grooves 10, which grooves provide a free communication between the holes and the air-space outside the ring. By thus making the outer part of the ring solid and the inner part porous there is presented a strong and tough resistance against a collapse of the tire coupled with a maximum air-space within the tubes. When the inner tube is deflated and the case tends to collapse, the cushion-ring forms a support or bearing and prevents a complete collapse of the tire, as shown in Fig. 3. In this relation of the parts the bearing of the inner face $6^a$ of the ring is against the inner tube and the adjacent reinforced parts $1^a$ of the case located in the metallic rim 3 and between the narrow edges $3^a$ thereof, which laterally-extended and resilient support prevents any parts of the tire from being bruised or cut. By means of the cushion-ring a complete collapse of the tire is prevented, and the diameter of the wheel is so slightly reduced that an attentive chauffeur can quite readily control the vehicle in event of puncture or other similar accident. Furthermore, the inserted ring so cushions the wheel that the journey of the vehicle can be continued to a convenient repair-station without any special discomfort to the passengers.

For assembling the parts the cushion-ring is preferably first made as a straight piece cut to the proper length with the beveled ends 5ª.

The inner tube is formed in the usual manner, and before joining and cementing the beveled ends 4ª, the cushion-ring is inserted in the tube, after which the abutting ends of the ring and the tube are successively cemented together.

While the cushion-ring is shown and described with its inner part made porous by means of radial holes, it is not intended to limit the scope of the invention to such specific manner of making the ring.

What I claim as my invention, and desire to secure by Letters Patent, is—

1. A pneumatic tire comprising a case, an inner tube therein, and a resilient ring in the tube having its outer part solid and its inner part porous and having its inner side adjacent to the tube and its outer side at an interval therefrom.

2. A pneumatic tire comprising a case, an inner tube therein and a resilient ring in the tube having its inner side adjacent to the tube and its outer side at an interval therefrom, there being radial holes and communicating laterally annular grooves in the inner side of the ring.

In testimony whereof I have hereunto signed my name to this specification in the presence of two subscribing witnesses.

FRANK E. CASE.

Witnesses:
HARRY FREASE,
MINNIE F. ANTHONY.